W. V. TABER.
FLUE CLEANER.
APPLICATION FILED FEB. 8, 1911.
1,003,545.
Patented Sept. 19, 1911.
2 SHEETS—SHEET 1.
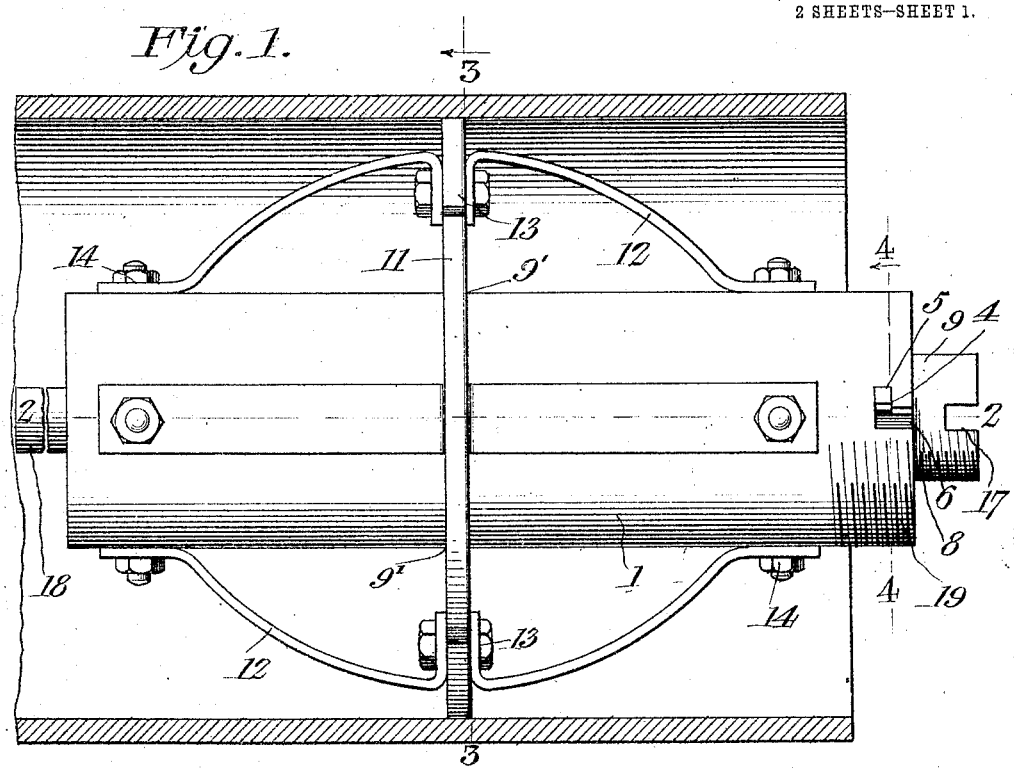
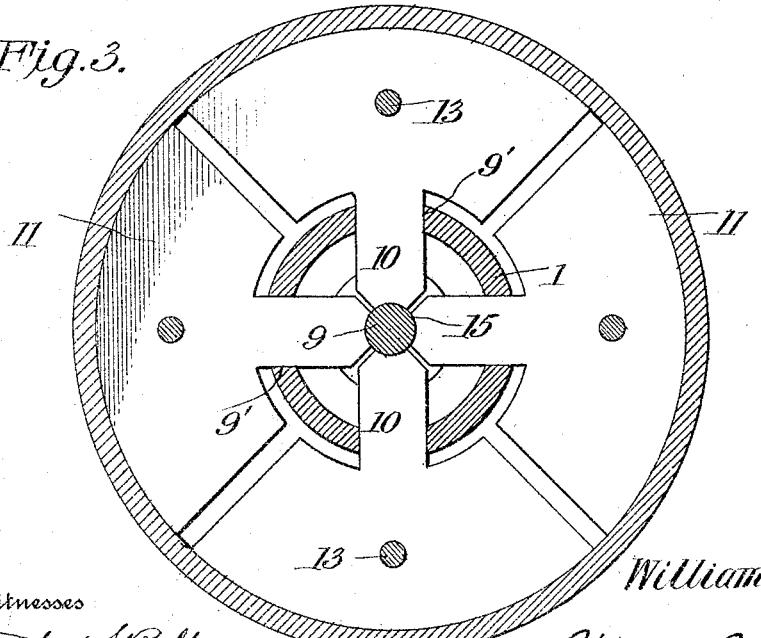
Witnesses
Fenton S Bell
James E Roche
Inventor
William V. Taber
By Victor J. Evans
Attorney W. V. TABER.
FLUE CLEANER.
APPLICATION FILED FEB. 8, 1911.
1,003,545.
Patented Sept. 19, 1911.
2 SHEETS—SHEET 2.
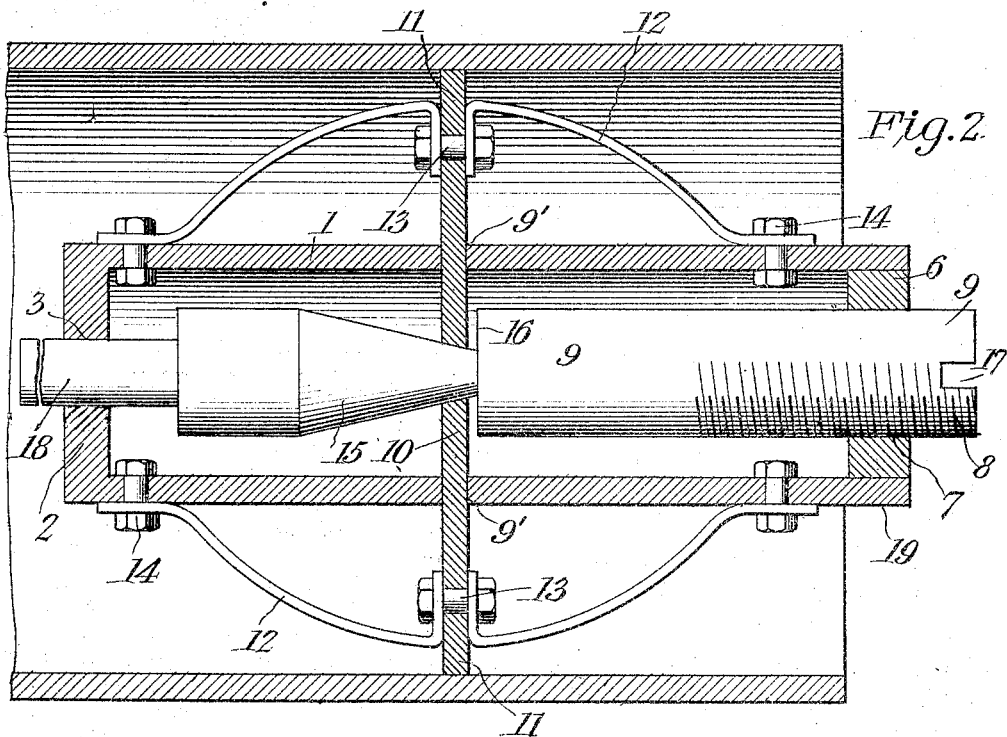
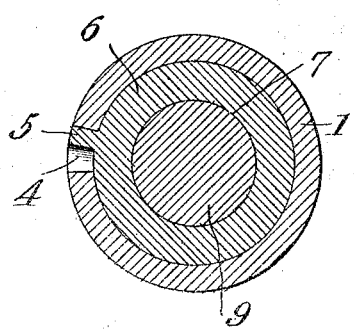
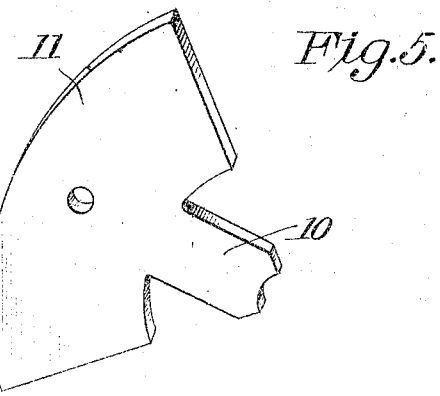
Witnesses
Fenton S. Belt
James A. ____
Inventor
William V. Taber
By Victor J. Evans
Attorney

UNITED STATES PATENT OFFICE.

WILLIAM V. TABER, OF NOT, MISSOURI.

FLUE-CLEANER.

1,003,545. Specification of Letters Patent. Patented Sept. 19, 1911.

Application filed February 8, 1911. Serial No. 607,227.

*To all whom it may concern:*

Be it known that I, WILLIAM V. TABER, a citizen of the United States of America, residing at Not, in the county of Shannon and State of Missouri, have invented new and useful Improvements in Flue-Cleaners, of which the following is a specification.

This invention relates to flue cleaners, and has for an object to provide a device of this character including yieldingly supported radially extending scraping blades or elements and to provide means for adjusting or moving the blades radially and into effective scraping contact with the flue.
In the drawings, forming a portion of this specification and in which like numerals of reference indicate similar parts in the several views:—Figure 1 is a section through a portion of the flue showing my improved cleaner therein. Fig. 2 is a longitudinal section through the cleaner on line 2—2 of Fig. 1. Fig. 3 is a section on line 3—3 of Fig. 1. Fig. 4 is a section on line 4—4 of Fig. 1. Fig. 5 is a perspective view of one of the scraping blades.

My improved scraper comprises a cylindrical member 1 which is formed at one end to provide a head 2 having an opening 3 therein for a purpose to be hereinafter described. The opposite end of the member 1 is formed to provide a bayonet slot 4 in which the pin 5 of the sleeve or bushing 6 is removably fitted. This sleeve or bushing is formed to provide a threaded passage 7 in which the correspondingly threaded surface 8 of the adjusting member 9 is engaged.

The member 1 is formed at or near its center with a plurality of radial substantially elongated or rectangular slots 9' in which the stem portions 10 of the scraping blades or segments 11 are fitted and adapted for movement radially of the member 1. The segments or scraping blades 11 are identically constructed and each is yieldingly supported by a plurality of flat leaf springs 12. These springs extend in opposite directions to each other and their inner ends are bolted or otherwise suitably secured, at 13, to the scraping blade. The opposite ends of the springs are bolted or otherwise suitably secured to the member 1, as at 14. The springs 12 exert their tension to hold the blades 11 normally at the innermost extent of their movement so that the inner extremities of the stems 10 are arranged wholly within the cylindrical member and directly in the path of movement of the beveled or substantially conical surface 15 on the intermediate portion of the adjusting member 9. The stem portions 10 of the scraping blades normally rest against the shoulder 16 at the small end of the conical portion or actuating surface 15.

The adjusting member 9 has the outer end of its threaded portion 8 formed to provide a tool engaging notch 17 in which the tool may be inserted and manipulated so as to cause the adjusting member 9 to move longitudinally in the cylindrical member 1. The opposite end of the adjusting member 9 is formed to provide a relatively long reduced guide stem 18 which is movable in the opening 3 in the head 2 of the member 1.

From the construction described it will be seen that the cleaner may be arranged within the flue and the adjusting member operated so as to obtain the desired expansion of the scraping blades or elements 11 so that the combined diameter of the blades will be equal to the internal diameter of the flue, causing the flat scraping surfaces of the blades to be moved yieldingly into effective scraping contact with the inner surface of the flue. After the desired adjustment of the blades has been obtained the cleaner may be reciprocated within the flue by any suitable means. By providing the detachable bushing or sleeve 6 at one end of the cylindrical member I provide for the interchangeable association therewith of similar bushings each having an opening of a different diameter so as to accommodate adjusting members of different sizes, according to the expansion of the blades 11 desired. The cylindrical member 1 is formed with an exteriorly threaded portion 19 to which may be fitted any well known form of socket or chuck of the tool employed for moving the cleaner longitudinally in the flue. The position of the threaded portion 19 with respect to the bayonet slot 4 is such that when the coupling socket or chuck of the tool is engaged with the member 1 it will entirely close the slot 4 and thereby prevent any possible disconnection of the bushing or sleeve 6 from the member 1 when the latter is moved longitudinally in the flue.

I claim:

1. A flue cleaner comprising a member, a plurality of blades supported by the member and movable radially thereof, the said blades having portions extending into the member, a head at one end of the member, a bushing removably fitted to the opposite end of the member, a blade-adjusting member movable longitudinally in the member and having a portion slidably fitted in the head and having a portion threadedly fitted in said bushing, and a substantially conical surface formed on the adjusting member intermediate of the ends thereof and operating to engage the inner ends of the blades so as to move the blades radially on movement of the blade-adjusting member.

2. A flue cleaner comprising a cylindrical member, a plurality of blades supported by the member and movable radially thereof, the said member having a bayonet slot formed therein at one end and having an exteriorly threaded portion adjacent to the said slot, a sleeve removably fitting in the said member at one end thereof and provided with a pin for locking engagement in the bayonet slot, and a blade actuating member adjustably connected with the sleeve and movable longitudinally in the cylindrical member and provided with means for actuating the scraping blades for moving them radially.

In testimony whereof I affix my signature in presence of two witnesses.

WILLIAM V. TABER.

Witnesses:
W. P. EDWARDS,
W. H. LEDGERWOOD.